Jan. 27, 1931.  C. B. SCHNEIBLE  1,790,596
COLUMN
Filed May 16, 1927
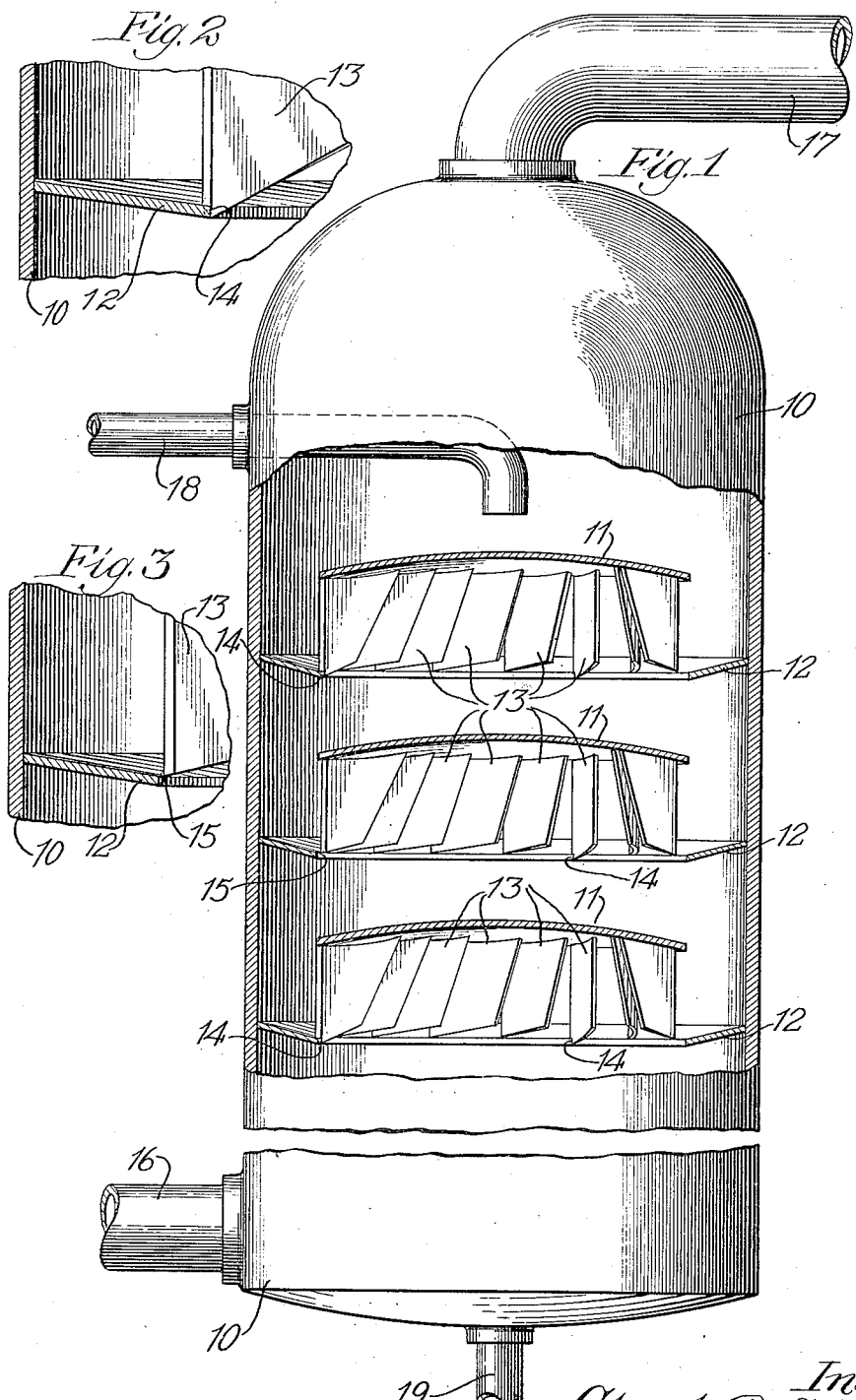
Inventor,
Claude B. Schneible,
by Dyrenforth, Lee, Chritton & Wiles,
Attys.

Patented Jan. 27, 1931

1,790,596

UNITED STATES PATENT OFFICE

CLAUDE B. SCHNEIBLE, OF EVANSTON, ILLINOIS, ASSIGNOR TO CLAUDE B. SCHNEIBLE, K. F. SCHREIER, AND BENJAMIN B. SCHNEIDER, AS TRUSTEES UNDER THE NAME OF THE JOSEPH SCHNEIBLE TRUST

COLUMN

Application filed May 16, 1927. Serial No. 191,739.

This invention relates to improvements in columns, such as distilling columns, dephlegmating towers, scrubbing towers, absorption towers and similar towers.

In U. S. Patent No. 1,366,956, issued February 1, 1921, there is described a column containing a sequence of baffle plates alternately of the plate and baffle ring type, said baffle plates being downwardly inclined to prevent the accumulation of liquid. Curved vanes are provided between the plates and baffle rings therebeneath, said vanes lying in a general direction substantially inclined to radial direction, for the purpose of imparting a circular and whirling motion to the ascending vapors or gases whereby effective contact and interaction between the descending liquid and the ascending vapors or gases are attained.

According to the present invention columns of this type are improved so as to give increased capacity with slightly less back pressure.

The invention will be readily understood from the following description of a preferred embodiment which is illustrated in the accompanying drawings, in which—

Figure 1 is an elevation, partly in section, of an improved column; and

Figs. 2 and 3 are sectional details.

Referring to the drawings, 10 is a column, 11 and 12 are baffle plates alternately of the plate and ring type. It is preferred that the plates and rings do not substantially overlap. Preferably the plates 11 are approximately the same size as the openings in the ring plates 12.

Vanes 13 are provided between plates 11 and rings 12 for the purpose of imparting a whirling or circular motion to the vapors passing therebetween. These vanes are preferably curved and lie in a general direction substantially inclined to the radial direction. The vanes preferably lie substantially completely below the plates 11 and do not substantially overlap the ring plates 12. The vanes 13 are preferably formed integrally with the plates 11 and the assemblage may be supported on the rings 12 by the slight overlap of a small number, for example, three or more, of the vanes on the rings 12 as shown at 14. (Fig. 2.) It is preferred that the remainder of the vanes 13 should be spaced somewhat inwardly from the inner periphery of the rings 12 as shown at 15. (Fig. 3.)

The improved column may be provided with suitable inlets and outlets, for example, 16 may be a vapor inlet, 17 a vapor outlet, 18 a liquid inlet and 19 a liquid outlet.

Although the present invention has been described in connection with the details of a specific embodiment thereof, it is not intended that such details shall be regarded as limitations upon the scope of the invention except in so far as included in the accompanying claim.

I claim:

A column containing a series of baffle plates alternately of the ring and plate type and vanes located in a direction inclined to the radial direction for imparting a circular motion to the vapors passing between said plates, said plates and rings not substantially overlapping and said vanes not substantially projecting beyond said plates.

In testimony whereof I have hereunto set my hand this 12th day of May, 1927.

CLAUDE B. SCHNEIBLE.